March 27, 1934.   A. BAUDAINS   1,952,964

FUEL SUPPLY SYSTEM OF INTERNAL COMBUSTION ENGINES

Filed Jan. 21, 1932

Inventor
Albert Baudains.
By Marion & Marion
Attorneys.

Patented Mar. 27, 1934

1,952,964

UNITED STATES PATENT OFFICE 1,952,964

FUEL SUPPLY SYSTEM OF INTERNAL COMBUSTION ENGINES

Albert Baudains, Fremantle, Western Australia, Australia

Application January 21, 1932, Serial No. 587,991
In Australia May 20, 1931

1 Claim. (Cl. 123—25)

This invention relates to improvements in the fuel supply systems of internal combustion engines.

A primary object of these improvements is to provide means whereby internal combustion engines can efficiently utilize relatively high boiling point fractions such as kerosene or even crude oil.

A secondary object of these improvements is their utilization as economizing means for internal combustion engines using low boiling point fractions such as petrol.

The invention includes means for regulating a supply of water and supplementary air, and their delivery under conditions facilitating efficient combustion of the atomized or vaporized hydrocarbon mixture delivered by the carburettor.

A feature of the invention resides in the means for the delivery of a highly heated gaseous mixture into the stream of ingoing gases, whereby there are set up correct conditions for efficient combustion. These highly heated gases are obtained by pre-heating sump gases, water from an independent supply, and delivering the mixture, there being a regulating device for controlling the amount of gases and water vapour admitted.

The invention will readily be understood by reference to the accompanying drawing, in which:—

Figure 1:
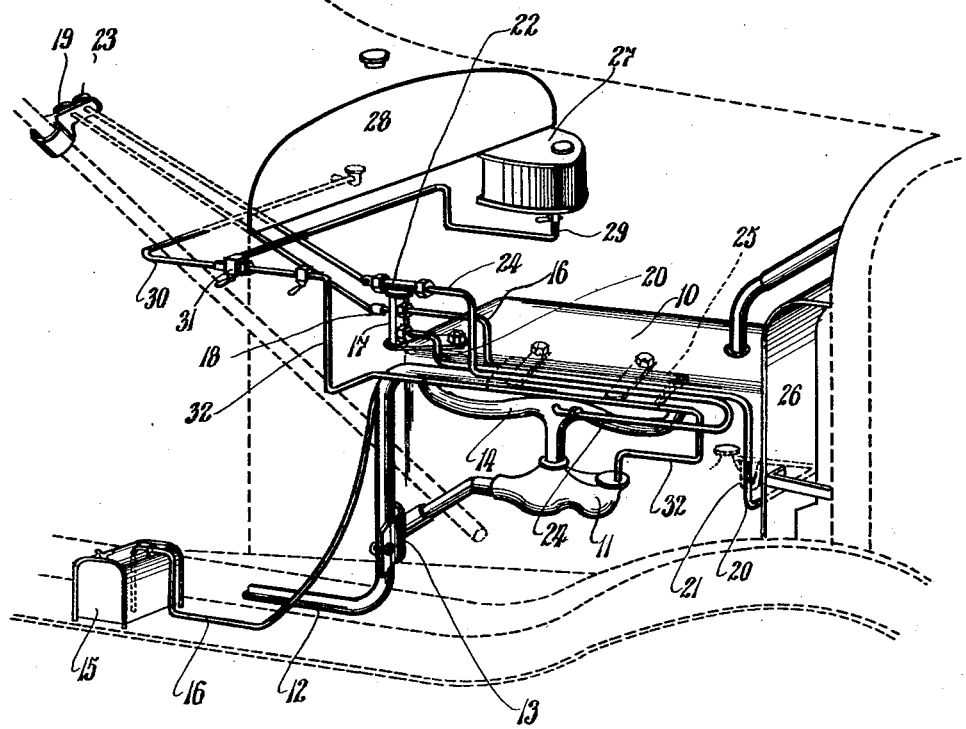
Figure 1 is a diagrammatic view showing an application to a motor vehicle, whilst:—
Figure 2:
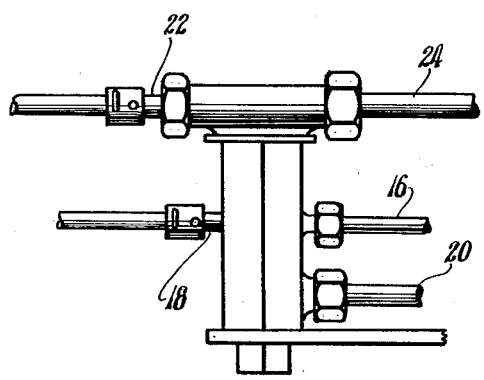
Fig. 2 is a view of the regulator and its appurtenant parts on a larger scale.

As shown in the drawing, the usual engine block is referenced 10, the carburettor is referenced 11, and the exhaust pipe 12. The air inlet of the carburettor is in the form of a sleeve 13 or the like surrounding the exhaust pipe so that incoming air is pre-heated. The usual manifold is indicated at 14. There is a water tank 15, leading from which is a tube 16 that passes over and and in juxtaposition to the manifold and then turns back and again passes over the manifold and enters a regulator 17. The admission of water to such regulator is controlled by a valve 18, preferably operated by a rod terminating at a button 19 adjacent to the dash. There is another tube 20 in communication with the sump at any convenient point, there being conveniently a U bend 21 therein with a small drain hole at the bottom. The tube in question also passes over the manifold and then leads into a lower part of the regulator 17. Also forming part of the regulator there is a valve 22, controlled by a rod terminating in another button 23 adjacent to the dash. The valve 22 controls the gas or vapour allowed to leave the regulator through a tube 24. This latter tube also passes over the manifold, and conveniently turns back and leads into the intake manifold adjacent to where the gaseous products escape from the carburettor.

The various tubes that pass over and around the manifold are conveniently protected or lagged by a cover 25, held in position conveniently to the engine block. There is also a shield 26 placed behind the radiator in line with the manifold and the various tubes associated therewith, such shield having for its object to prevent cooling draughts of air from causing dissipation of the heat radiated from the manifold. There is a fuel tank 27 that will be used for the supply of the lighter starting fuel such as petrol, whilst the bulk fuel tank is referenced 28. A tube 29 leads from the starting fuel tank, as does a pipe 30 from the bulk tank, and these junction at a two-way valve 31 that permits either of the fuels to be admitted to the carburettor. In fact, if desired, the valve can be of such a nature that a mixture of fuels is admitted. This admission of fuel to the carburettor is through the medium of a tube 32 that also passes over the manifold and is lagged by the cover 25. The tube 32 may have a by-pass leading direct to the carburettor.

The operation of the arrangement is as follows.

Starting up is on the lighter fuel contained in the tank 27, and on such fuel the carburettor functions in the normal manner. The efficiency thereof is, however, increased by the admission of a heated mixture of gases into the manifold through the tube 24, the composition of the said gases being controlled by the regulator 17. The arrangement can therefore be used with a low boiling fraction, and used in such manner there will be a considerable economy in fuel. When, however, it is desired to use it for a higher boiling fraction such as kerosene, the engine is allowed to become hot and the two-way valve 31 is then operated so that the lighter boiling fraction is turned off and the higher boiling fraction is admitted to the carburettor. It will be noted that the tube 32 leading the fuel to the carburettor is pre-heated, also that the air admitted to the carburettor is pre-heated. Furthermore, the gas passing from the sump and also the water passing to the regulator are both pre-heated. Finally, the mixture of gases and water or water vapour discharged from the regulator through the tube 24 is pre-heated before being passed into the manifold. Furthermore, the pre-heating effect in the various stages described is encouraged by the fact that the shield 26 prevents undue radiation of heat. It will further be noted that the regulator 17 is itself in juxtaposition to the engine and manifold.

An important feature of this invention is therefore that there is efficient pre-heating of the air, fuel, and supplementary gases or vapours. Such pre-heating may be effected by the waste heat from the manifold or exhaust pipe, or indeed by any other source of heat.

I claim:—

Improvements in and relating to fuel supply systems of internal combustion engines, comprising a water tank; a tube leading from the said tank and then being heated; a regulator; a valve controlling the admission of water to the said regulator; a tube in communication with the sump, such tube being heated and placed in communication with the regulator; a valve controlling the discharge of heated gases and vapour from the regulator; a tube connected to the said valve and being heated and then led into the manifold; a tube leading the hydrocarbon liquid from the fuel supply tank and being pre-heated on its way to the carburettor; an air admission tube to the carburetor in juxtaposition to the exhaust pipe so that the entering air is pre-heated; a tank for the starting fuel; another tank for the normal running fuel; and tubes leading from the above tanks to a two-way valve for the controlled admission of one of the fuels to the tube that after being pre-heated passes to the carburetor.

ALBERT BAUDAINS.